United States Patent
Marshall

[11] 3,880,570
[45] Apr. 29, 1975

[54] METHOD AND APPARATUS FOR REDUCING NITRIC IN COMBUSTION FURNACES

[75] Inventor: David M. Marshall, Akron, Ohio

[73] Assignee: The Babcock & Wilcox Company, New York, N.Y.

[22] Filed: Sept. 4, 1973

[21] Appl. No.: 394,234

[52] U.S. Cl. .................. 431/4; 431/115; 431/182
[51] Int. Cl. ........................................ F23I 7/00
[58] Field of Search .............. 431/4, 5, 9, 182, 185, 431/115, 116; 110/49 R; 122/479 A

[56] References Cited
UNITED STATES PATENTS

| | | | |
|---|---|---|---|
| 2,224,544 | 12/1940 | Keller | 431/115 X |
| 2,688,360 | 9/1954 | Haynes et al. | 431/115 |
| 2,819,702 | 1/1958 | Koch | 122/479 A |
| 2,856,908 | 10/1958 | Koch | 122/479 A |
| 2,878,792 | 3/1959 | Cruise et al. | 122/479 A |
| 2,904,417 | 9/1959 | Te Nuyl | 431/9 |
| 3,256,924 | 6/1966 | Campbell et al. | 431/9 X |
| 3,743,471 | 7/1973 | Jaeger | 431/115 |
| 3,744,242 | 7/1973 | Stettler et al. | 431/116 X |
| 3,781,162 | 12/1973 | Rudd et al. | 431/115 |

FOREIGN PATENTS OR APPLICATIONS

| | | | |
|---|---|---|---|
| 141,245 | 1/1961 | U.S.S.R. | 431/115 |

Primary Examiner—Manuel A. Antonakas
Assistant Examiner—William C. Anderson
Attorney, Agent, or Firm—Joseph M. Maguire; Robert J. Edwards

[57] ABSTRACT

An improved fuel burning method and apparatus including the delivery of flue gas to the burner to inhibit the formation of nitric oxide in the combustion process.

4 Claims, 3 Drawing Figures

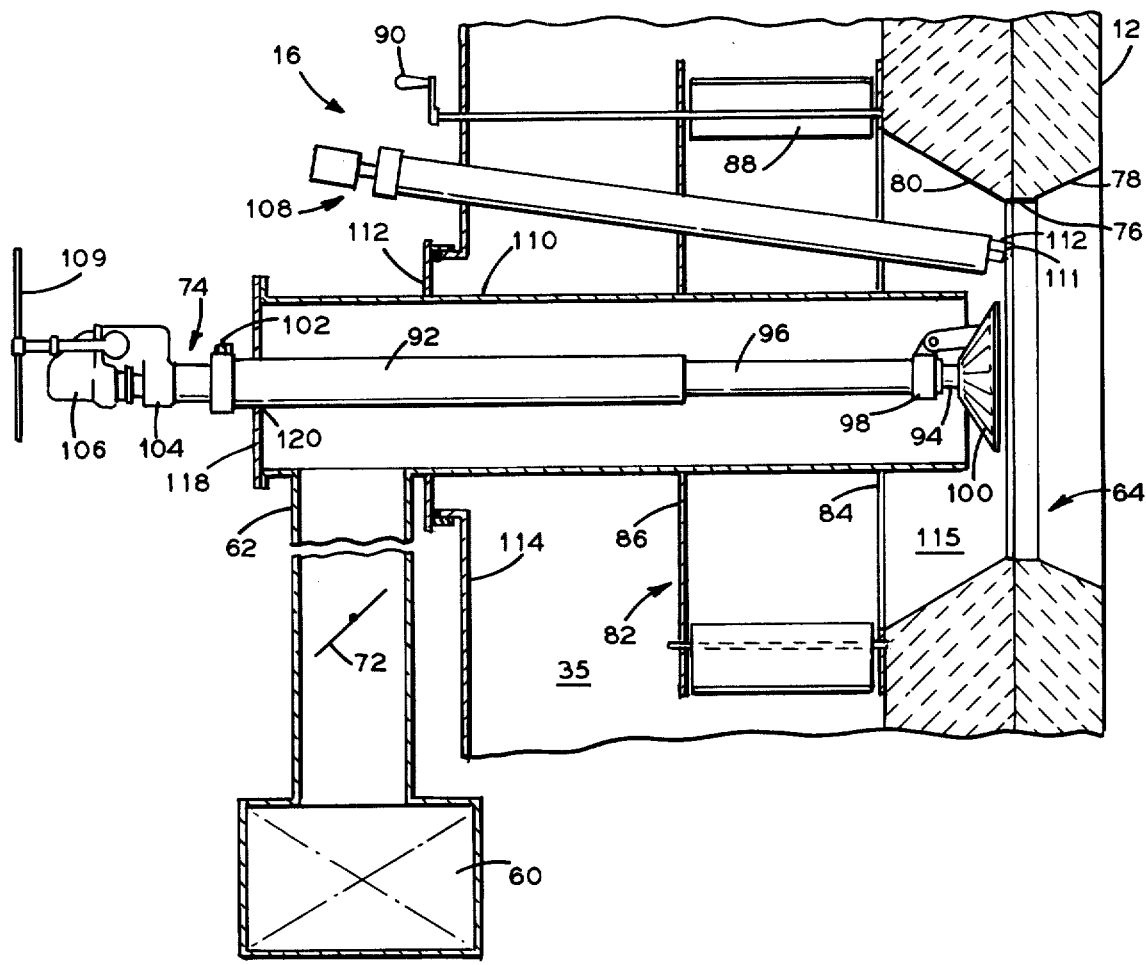

3,880,570

METHOD AND APPARATUS FOR REDUCING NITRIC IN COMBUSTION FURNACES

BACKGROUND OF THE INVENTION

The present invention relates to fuel burners and more particularly to an improved burner arrangement which achieves a reduction in the formation of nitric oxides by lowering the combustion zone temperature.

There is a present day growing concern with the immediate and long term problems created by recent increases in air pollution and with this concern comes an awareness that steps must be taken to reverse this upward trend in pollution. Thus, great efforts are now being made by the public and private economic sectors to develop measures for preventing potentially polluting particles and gases from being discharged into the atmosphere. One such source of atmospheric pollution is the nitrogen oxides ($NO_x$) present in the stack effluent of fossil fuel fired vapor generating units. Nitric oxide (NO) is an invisible, relatively harmless gas, however, as it passes through the vapor generator and is released to the atmosphere, it comes into contact with oxygen and reacts therewith to form nitrogen dioxide ($NO_2$) or other oxides of nitrogen collectively referred to as nitrogen oxides. Nitrogen dioxide is a yellow-brown gas which, if contained in sufficient concentrations, is toxic to animal and plant life. It is this gas that creates the visible haze at the stack discharge of a vapor generator.

Nitric oxide is formed as a result of the reaction of nitrogen and oxygen during the combustion process and may be thermal nitric oxide and/or fuel nitric oxide. The former occurs from the reaction of the nitrogen and oxygen contained in the air supplied for the combustion of a fossil fuel whereas the latter results from the reaction of the nitrogen contained in the fuel with the oxygen in the combustion air. We are here principally concerned with thermal nitric oxide which is by far the most prevalent in combustion processes of the type hereunder discussion.

The rate at which thermal nitric oxide is formed is dependent upon any or a combination of the following variables; (1) flame temperature, (2) residence time of the combustion gases in the high temperature zone, and (3) excess oxygen supply. The rate of formation of nitric oxide increases as flame temperature increases. However, the reaction takes time and a mixture of nitrogen and oxygen at a given temperature for a very short period of time may produce less nitric oxide than the same mixture at a lower temperature, but for a longer period of time. In vapor generators, wherein the combustion process may generate flame temperatures in the order of 3700°F, the time-temperature relationship governing the reaction is such that at flame temperatures below 2900°F no appreciable nitric oxide is formed, whereas above 2900°F the rate of formation of nitric oxide increases rapidly.

It is apparent from the foregoing discussion that the formation of nitric oxide can be reduced by lowering flame temperatures in any degree and will be minimized with a flame temperature at or below 2900°F.

Heretofore, efforts at reducing nitric oxide formation have included the injection of recirculated gases into the combustion air stream at some point ahead of the fuel burners. This method has proven successful in bringing about lower combustion temperatures with concomitant reductions in the formation of nitric oxide. However, it has been found economically wanting as a result of the higher static pressures required of gas fans to overcome the system resistances inherent to fuel burning apparatus.

SUMMARY OF THE INVENTION

The present invention is associated with the furnace chamber of a vapor generating and superheating unit and includes a plurality of improved burner apparatus firing through corresponding burner ports formed in the furnace boundary wall. Each of the burner apparatus extends through a common windbox and comprises a register assembly located within the windbox and having adjustable vanes for imparting a whirling motion to the combustion air being discharged through the burner port, a burner nozzle extending through the windbox and register assembly to inject fuel through the burner port for mixing with the air to form a combustible mixture therewith and an ignition device to light the combustible mixture and thereby produce a combustion zone within the furnace. In accordance with the invention, a conduit extends through the windbox and register assembly and has its outlet end opening downstream air flow-wise of the register vanes to deliver recirculated flue gas for mixing with the fuel and combustion air. Each conduit is separately connected to a manifold to receive therefrom a regulated quantity of flue gas. The manifold is in turn connected to duct work for receiving flue gas which is withdrawn from a point downstream gas flow-wise of the furnace chamber. The system for recirculating flue gas includes fan apparatus to raise the gas pressure and may also be used to introduce recirculated flue gas at locations other than the fuel burners for purpose of steam temperature control.

An objective of the present invention is to inhibit the formation of nitric oxide in the combustion of fossil fuels by mixing substantially inert flue gas with the fuel and air and thus cause the flue gas to absorb some of the heat of combustion so as to reduce the maximum flame temperature within the combustion zone thereby inhibiting the formation of nitric oxide.

Another objective of the invention is to achieve a reduction in capital expenditures and operating costs by having the recirculated gas introduced downstream air flow-wise of the register vanes thereby bypassing the relatively high system resistance associated therewith and thus allowing the use of lower static pressure fans.

Still another objective of the invention is to optimize the quantity of recirculated gas used for nitric oxide reduction by introducing recirculated gas into the burner port where maximum turbulence and flow velocities are achieved thereby providing optimum conditions for the mixing of the flue gas, fuel and combustion air being discharged therethrough.

A further objective of the invention is to provide the means wherein the quantity of flue gas may be regulated to correspond to the quantity of combustion air being delivered to that burner.

BRIEF DESCRIPTION OF THE DRAWINGS

FIG. 3 is a detail sectional elevation view of a fuel burning apparatus embodying the invention.

DESCRIPTION OF THE PREFERRED EMBODIMENTS

Figure 1:
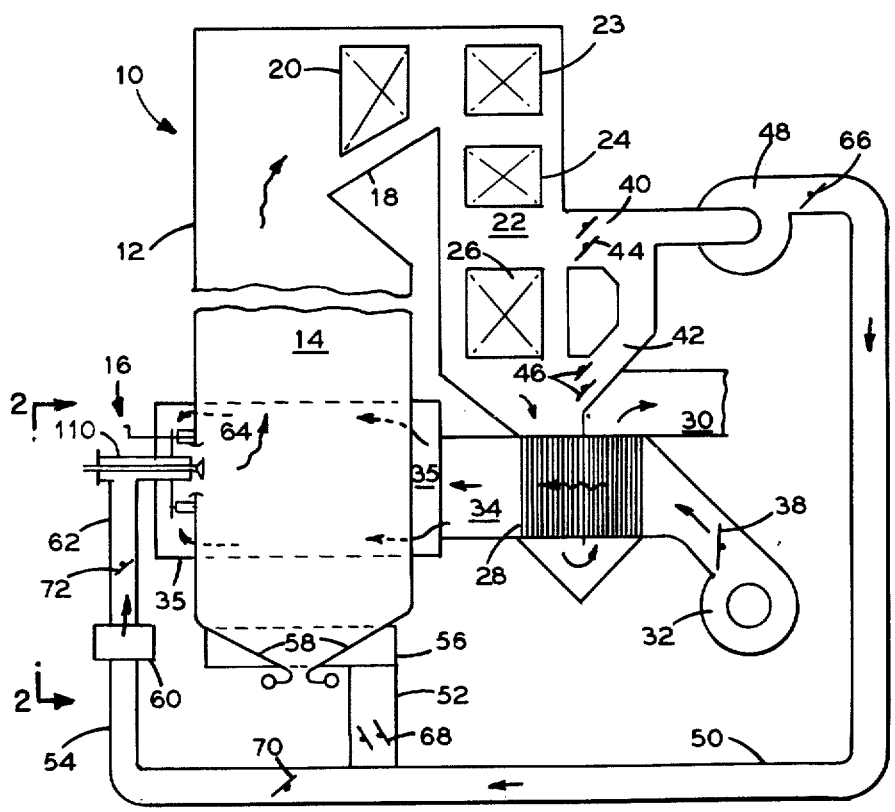
FIG. 1 is a schematic sectional elevation view of a vapor generator using fuel burning apparatus embodying the invention.

Referring to FIG. 1 there is shown a vapor generator 10 including water cooled walls 12 which define a furnace chamber or combustion space 14 fired by a plurality of burner apparatus to which fuel is fed in response to load demand. One of the burner apparatus is shown at 16 and will be hereinafter described in detail with reference to FIG. 3. The products of combustion, leaving the furnace chamber 14 are commonly referred to as flue gas, and flow upwardly around the nose portion 18, and thence through the convection gas pass 20 containing the secondary superheater 22, the reheater 23, the primary superheater 24 and the economizer 26. The flue gas leaving the convection pass 22 flow through the tubes of an air heater 28 and are thereafter conveyed by a duct 30 for discharge through a stack (not shown). A forced draft fan 32 supplies combustion air to the vapor generator and causes it to flow over the air heater tubes and thence through a duct 34 to a windbox 35 to be apportioned among fuel burners 16. A damper 38 is associated with the forced draft fan 32 to regulate the total quantity of air being admitted to the fuel burners in response to load demand.

The steam temperature leaving the unit, particularly the reheat temperature, is wholly or in part controlled by altering the heat absorption pattern within the unit through the introduction of a regulated quantity of flue gas into the furnace, which gas is withdrawn from a point downstream gas flow-wise of the furnace.

In the illustrated embodiment, flue gas is withdrawn from the convection gas pass 22 at points either between the primary superheater 24 and the economizer 26 or between the latter and the air heater 28, to be initially conveyed by the respective branch ducts 40 and 42. Dampers 44 and 46 are associated with the ducts 40 and 42, respectively, and provide the means where either branch duct may be used to the exclusion of the other or where both ducts may be used concurrently. It will be understood that the source of flue gas and the location for the withdrawal thereof may be other than that shown herein. The flue gas conveyed through either or both of the branch ducts 40 and 42 is picked up by a gas recirculation fan 48 and boosted in pressure before being discharged into the main duct 50 for apportionment between the branch ducts 52 and 54, respectively. The flue gas passing through duct 52 is delivered to a plenum chamber 56 for introduction into the furnace through a plurality of spaced openings in the hopper floor 58. The flue gas passing through duct 54 is delivered to the manifold 60 and thence passed through the burner inlet duct 62 for flow along the conduit 110 for discharge through the burner port 64. It will be understood that the number of gas recirculation fans and associated ducts may vary in accordance with the capacity requirements of the unit.

A damper 66 is associated with the gas recirculation fan 48 to regulate the quantity of flue gas being conveyed through the main duct 50. The dampers 68 and 70 are disposed within the branch ducts 52 and 54, respectively to regulate the apportionment of flue gas therebetween. A damper 72 is disposed within the burner inlet duct 62 to regulate the quantity of flue gas being discharged through the corresponding burner port 64.

Figure 2:
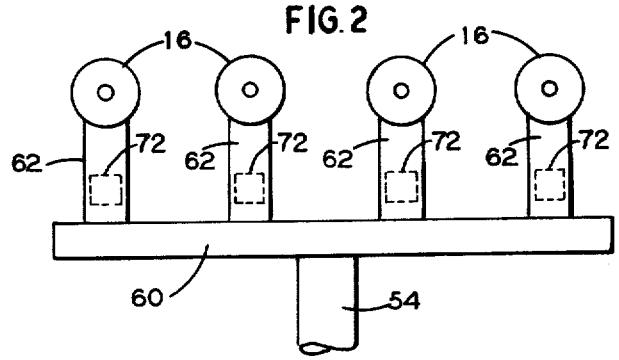
FIG. 2 is a front view taken along line 2—2 of FIG. 1.

Referring to FIG. 2 there is shown the outlet end of the branch duct 54 discharging into the manifold 60 which, in turn, communicates with a row of horizontally spaced burners 16 through corresponding inlet ducts 62 each of which is equipped with a damper 72 to regulate the quantity of flue gas being admitted to the associated burner.

Referring to FIG. 3, the invention is set forth in conjunction with a liquid fuel burner or nozzle 74, however, it should be understood that the invention is equally applicable with gaseous and solid fuel burners. There is shown a fragmented part of the wall 12 including a refractory lined burner port 64 formed of a short cylindrical section or throat collar 76 connected at its discharge end with a flaring section 78 and at its inlet end with the smaller diameter end of a frusto-conical section 80. The fuel burning apparatus 16 includes a cylindrical register assembly 82 located within the windbox 35 and suitably supported therefrom and arranged to receive the combustion air for discharge through the burner port 64. The register assembly 82 is coaxial with the burner port 64 and includes spaced front and back annular plates 84 and 86, respectively, and a plurality of separate blades or vanes 88 preferably of arcuate cross-section and circumferentially arranged and pivotally mounted between the front and back plates 84 and 86 so as to be rotatable about their respective axis which lies in a direction parallel to the projected axis of the burner port 64. The preferred arrangement calls for the vanes 88 to be interconnected by linkage (not shown) for simultaneous adjustment from a common exterior lever 90. The vanes 88 can be closed to substantially cut-off combustion air flow to the furnace, and can be adjustably opened to regulate the quantity of air passing therethrough.

The liquid fuel burner or nozzle 74 includes a guide tube 92 which accommodates the passage therethrough of the burner barrel 94 and its associated distance piece 96. The front end of the distance piece 96 is fitted with a support ring 98 to which there is attached an impeller or air deflector 100 shaped as a truncated cone and concentrically disposed about the longitudinal axis of the burner throat 64. The impeller position along the burner throat axis may be adjusted within limits by moving the distance piece 96 through the guide tube 92 and may be locked in the selected position by tightening the bolt 102. The rear end of the distance piece 96 is threaded to receive the yoke 104 which is connected to the liquid fuel and atomizing vapor supply lines (not shown). The discharge end of the yoke 104 is connected to the atomizer assembly 106 for the through passage of fuel and atomizing vapor. A leak-proof fit between the yoke 104 and the atomizer assembly 106 is achieved by introducing a gasket (not shown) between the mating surfaces and applying pressure with the locking device 109. The burner barrel 94 has its inlet end connected to the atomizer assembly 106 and its outlet end fitted with a sprayer plate (not shown). An ignition device 108 is provided for lighting the liquid fuel burner and includes a pipe member 111 and an electrode 112.

According to the present invention the burner apparatus 16 includes a cylindrically shaped conduit 110 concentrically disposed in spaced surrounding relation with a major portion of the liquid fuel burner 74. The illustrated embodiment has the conduit 110 originating outside of the windbox 35 and extending through an access closure plate 112 formed in the burner wall 114 and across the width of the windbox 35 to a point within the burner port 64, preferably adjacent to the burner throat 76. The leading end portion of the conduit 110 is radially spaced from the frusto-conical section 80 to form an annular passageway 115 therebetween. The rear end face of the conduit 110 is covered by a closure plate 118 with the latter including an opening 120 to accommodate the passage therethrough of the liquid fuel burner guide tube 92. The burner duct 62 communicates with the conduit 110 by penetrating its cylindrical wall along the portion lying outside of the windbox 35. The damper 72 regulates the quantity of flue gas being admitted to the conduit 110 from the manifold 60.

It should be noted that the conduit 110 is specifically arranged to discharge the recirculated flue gas downstream air flow-wise of the register vanes 88 thus bypassing the system resistance occurring at the vanes 88 as they regulate the quantity of combustion air passing through the register 82 and impart a whirling motion to the air as it is delivered to the burner port 64.

In the operation of the preferred embodiment, there is provided a gas recirculation system utilized for steam temperature control as well as for nitric oxide abatement. The recirculated flue gas may be withdrawn from one or more suitable locations downstream gas flow-wise of the furnace chamber and re-introduced into the furnace at one or more suitable locations. As illustrated, the flue gas is withdrawn from the convection gas pass 22 at locations either upstream or downstream gas flow-wise of the economizer 26 and passed through either or both branch ducts 40 and 42 past the dampers 44 and 46 into a gas recirculation fan 48 wherein the pressure of the flue gas is raised to the level required to overcome system resistances. A damper 66 regulates the total quantity of flue gas being recirculated by the system and being discharged through the main duct 50 to be separately distributed as required for nitric oxide abatement and for steam temperature control. Flue gas may be withdrawn through duct 52 and passed into a plenum chamber 56 for introduction into the furnace chamber 14 through a plurality of spaced openings (not shown) in the hopper floor 58. The quantity of flue gas being withdrawn through duct 52 is regulated by damper 68 in response to a controller (not shown) monitoring the steam temperatures leaving the reheater 23. Flue gas may also be withdrawn through duct 54 and passed to the manifold 60 and thereafter distributed to the several burner apparatus 16 through separate inlet ducts 62. A damper 70 is located in duct 54 to regulate the quantity of flue gas passing therethrough in response to a controller (not shown) having a set point which may be adjusted to maintain the desired static pressure within the manifold 60. The dampers 72 regulate the quantity of flue gas being conveyed to the respective conduits 110 of each burner apparatus 16, in response to controllers (not shown) having respective set points which may be adjusted to maintain a desired fixed proportion between the rate of airflow and flue gas being delivered to each burner. The total air required for the combustion of fuel is delivered by one or more forced draft fans 32, each being equipped with a damper 38 which regulates the quantity of air in response to load demand on the vapor generator 10.

The combustion air is heated as it comes into indirect contact with the flue gas flowing through the tubes of the air heater 28 and is thereafter conveyed through the duct 34 to the windbox 35 for apportionment among the several burner apparatus 16. The quantity of combustion air to each of the burner apparatus 16 may be further regulated through the positioning of the register vanes 88. The register vanes 88 may also be used to increase or decrease the degree of spin or whirl imparted to the air being discharged therefrom. It should be appreciated that considerable system resistance is associated with the register vanes 88 and that in accordance with the present invention, the flue gas being used to inhibit the formation of nitric oxide is delivered to the burner apparatus 16 through an arrangement which bypasses the register vanes 88 and the system resistance attendant thereto. The quantity of fuel oil being delivered to each of the burner apparatus 16 is regulated in response to load demand with the fuel to be burned being injected into the respective ports 64 and intimately mixed with the air to form a combustible mixture therewith. An ignitor 108 is used to light the combustible mixture and form a combustion zone within the furnace chamber 14. The flue gas being delivered to the respective ports 64 is mixed with the fuel and combustion air and acts to reduce the maximum flame temperature within the combustion zone by absorbing some of the heat generated in the combustion process.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A method of inhibiting the formation of nitric oxide from the combustion of fuel including a furnace chamber and a passageway in gas receiving communication therewith and having at least one burner port, a register assembly having a discharge end opening to said burner port, a fuel nozzle extending through the register assembly and having a discharge end opening within said port, a deflector plate disposed in surrounding relation to said nozzle discharge end, a conduit extending through said register assembly in spaced concentric relation about the nozzle and having a discharge end opening adjacent said deflector plate and comprising the steps of:

supplying combustion air to the register assembly for discharge to said burner port, imparting a whirling motion to the combustion air passing through said register assembly, combining the fuel and air to produce a combustible mixture, igniting the combustible mixture in the burner port to form a combustion zone within said furnace chamber, withdrawing flue gas from said passageway, and conveying the flue gas to the conduit for discharge into the combustion air within the burner port along a path substantially parallel to the central axis of said port, said flue gas absorbing some of the heat of combustion thereby depressing the combustion zone temperature.

2. In combination with boundary wall means defining a furnace chamber and a passageway in gas receiving communication therewith and including at least one burner port, burner wall means spaced from the boundary wall means to form a windbox therebetween to which combustion air is supplied, a fuel burning apparatus associated with the burner port and including a register assembly disposed within the windbox to receive combustion air for discharge into the port, said register assembly including vanes for imparting a whirling motion to the combustion air, a nozzle extending through the register assembly and means delivering fuel to said nozzle for discharge into the whirling air within the burner port to form a combustible mixture therewith, a deflector plate disposed in surrounding relation to the nozzle discharge, means for igniting the mixture in the burner port to form a combustion zone within said furnace, the improvement comprising a conduit extending through said register assembly and terminating within the burner port upstream airflow-wise of the deflector plate, said conduit being immediately adjacent and concentrically spaced about the nozzle to form an annular passageway therebetween, said passageway opening into the port adjacent the deflector plate, and means delivering flue gas to the conduit for discharge into the combustion air along a path substantially parallel to the central axis of said port, said flue gas absorbing some of the heat of combustion thereby depressing the combustion zone temperature.

3. The combination according to claim 1 including duct means communicating with the passageway to receive flue gas therefrom for delivery to said conduit.

4. The combination according to claim 1 including a plurality of burner ports, separate duct means delivering flue gas to each of the conduits associated with said ports, and damper means disposed within each of the duct means for regulating gas flow therethrough independent of said remaining duct means.

* * * * *